US012614262B2

(12) United States Patent
Fukumoto

(10) Patent No.: US 12,614,262 B2
(45) Date of Patent: Apr. 28, 2026

(54) IMAGE PROCESSING APPARATUS, ENDOSCOPIC APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Junya Fukumoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 18/340,043

(22) Filed: Jun. 23, 2023

(65) Prior Publication Data

US 2024/0046436 A1 Feb. 8, 2024

(30) Foreign Application Priority Data

Aug. 3, 2022 (JP) ................................ 2022-124104

(51) Int. Cl.
*G06T 5/92* (2024.01)
*G06V 10/143* (2022.01)
(Continued)

(52) U.S. Cl.
CPC .............. *G06T 5/92* (2024.01); *G06V 10/143* (2022.01); *G06V 10/60* (2022.01); *G06V 10/751* (2022.01);
(Continued)

(58) Field of Classification Search
CPC ............. G06T 5/92; G06T 2207/10064; G06T 2207/10068; G06T 2207/20192;
(Continued)

(56) References Cited

U.S. PATENT DOCUMENTS 5,189,511 A * 2/1993 Parulski .................. H04N 1/60 358/518
9,542,734 B2 * 1/2017 Kimura ..................... G06T 5/40
(Continued)

FOREIGN PATENT DOCUMENTS

JP 2003319201 A 11/2003
JP 2005-252869 A 9/2005
(Continued)

OTHER PUBLICATIONS

Notice of Reasons for Refusal issued by the Japanese Patent Office on Mar. 9, 2026 in corresponding JP Patent Application No. 2022-124104, with English translation.

*Primary Examiner* — Henok Shiferaw
*Assistant Examiner* — Dion J Satcher
(74) *Attorney, Agent, or Firm* — Carter, DeLuca & Farrell LLP

(57) ABSTRACT

An image processing apparatus including a tone correction unit configured to generate a plurality of tone correction signals by converting tone characteristics of a plurality of image signals in different wavelength bands, an edge enhancement unit configured to generate an edge enhancement signal by performing predetermined processing with respect to at least one image signal of the plurality of image signals, and a combining unit configured to combine a signal based on the plurality of tone correction signals and the edge enhancement signal is provided. The tone correction unit is configured to generate at least two tone correction signals by converting tone characteristics of at least two image signals of the plurality of image signals while maintaining ratios between pixels respectively corresponding to the at least two image signals.

18 Claims, 4 Drawing Sheets

(51) Int. Cl.
*G06V 10/60* (2022.01)
*G06V 10/75* (2022.01)
*H04N 5/52* (2006.01)

(52) U.S. Cl.
CPC ..... *H04N 5/52* (2013.01); *G06T 2207/10064* (2013.01); *G06T 2207/10068* (2013.01); *G06T 2207/20192* (2013.01)

(58) Field of Classification Search
CPC ............ G06T 2207/10024; G06T 5/73; G06V 10/143; G06V 10/60; G06V 10/751; H04N 5/52
USPC ........................................................... 382/274
See application file for complete search history.

(56) References Cited

U.S. PATENT DOCUMENTS

| | | | | |
|---|---|---|---|---|
| 9,961,319 | B2* | 5/2018 | Tajima | H04N 9/74 |
| 2005/0140829 | A1* | 6/2005 | Uchida | H04N 5/142<br>348/E5.064 |
| 2006/0268358 | A1* | 11/2006 | Okada | H04N 23/88<br>358/448 |
| 2008/0187235 | A1* | 8/2008 | Wakazono | H04N 23/76<br>348/E5.091 |
| 2013/0294682 | A1* | 11/2013 | Yamashita | H04N 13/239<br>382/154 |
| 2013/0321706 | A1* | 12/2013 | Nakamura | H04N 9/73<br>348/655 |
| 2014/0292632 | A1* | 10/2014 | Chen | G09G 3/3406<br>345/102 |
| 2017/0026632 | A1* | 1/2017 | Ishiga | H04N 13/271 |
| 2019/0089924 | A1* | 3/2019 | Woo | H03G 3/20 |
| 2019/0094394 | A1* | 3/2019 | Matsumoto | H04N 25/30 |
| 2019/0269298 | A1* | 9/2019 | Kiba | G16H 40/63 |
| 2020/0184607 | A1* | 6/2020 | Hwang | G06T 5/20 |
| 2020/0397300 | A1* | 12/2020 | Talbert | H04N 23/125 |

FOREIGN PATENT DOCUMENTS

| | | | |
|---|---|---|---|
| JP | 2009027258 | A | 2/2009 |
| JP | 2018182741 | A | 11/2018 |

* cited by examiner

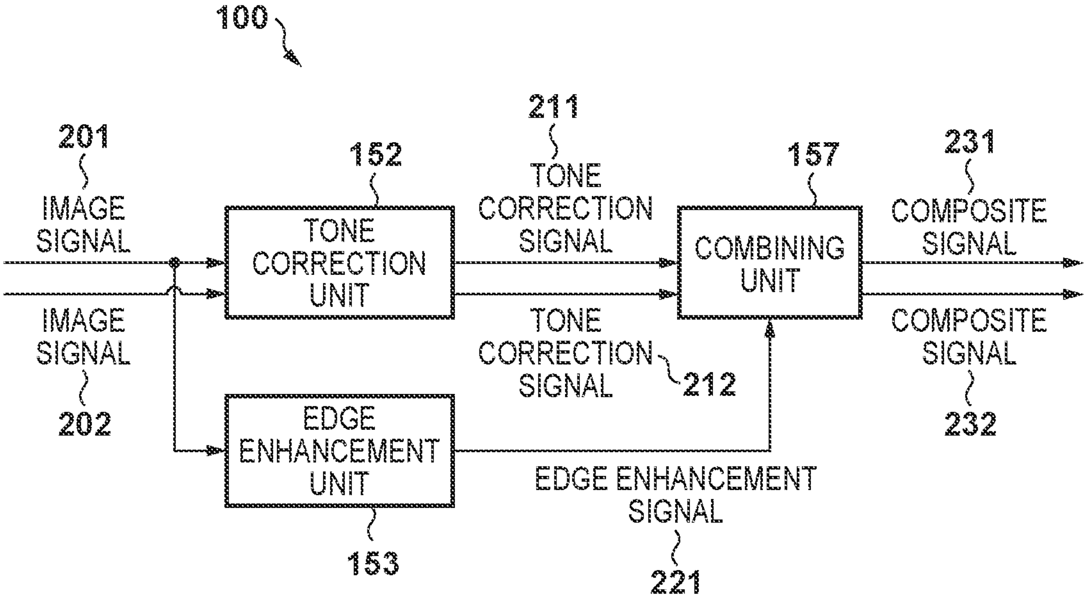
F I G. 1
100
201
IMAGE
SIGNAL
IMAGE
SIGNAL
202
152
TONE
CORRECTION
UNIT
153
EDGE
ENHANCEMENT
UNIT
211
TONE
CORRECTION
SIGNAL
TONE
CORRECTION
SIGNAL          212
EDGE ENHANCEMENT
SIGNAL
221
157
COMBINING
UNIT
231
COMPOSITE
SIGNAL
COMPOSITE
SIGNAL
232
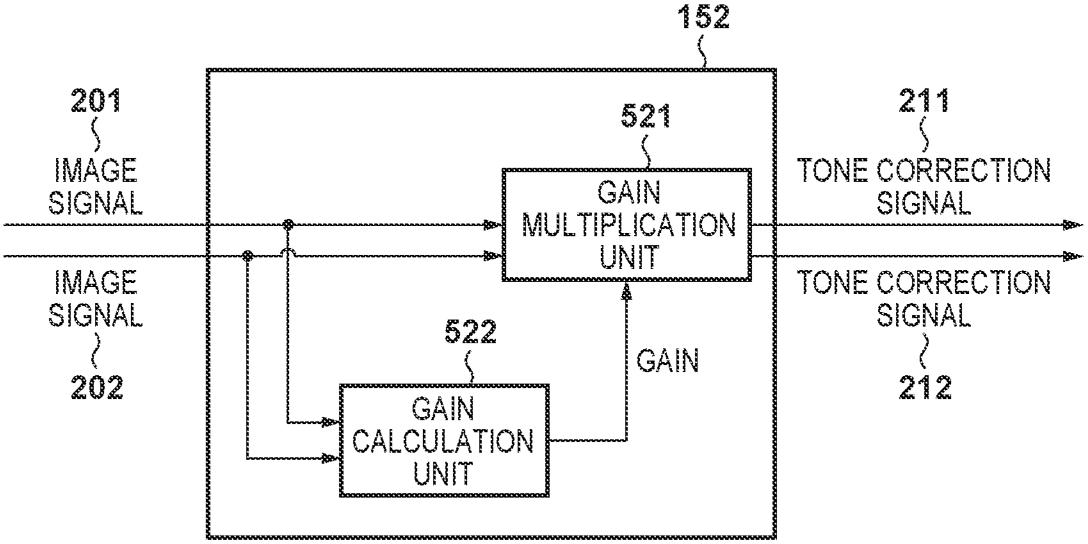
F I G. 2
152
201
IMAGE
SIGNAL
IMAGE
SIGNAL
202
521
GAIN
MULTIPLICATION
UNIT
522
GAIN
CALCULATION
UNIT
GAIN
211
TONE CORRECTION
SIGNAL
TONE CORRECTION
SIGNAL
212

IMAGE PROCESSING APPARATUS, ENDOSCOPIC APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an endoscopic apparatus, an image processing method, and a non-transitory computer-readable storage medium.

Description of the Related Art

An image processing apparatus performs various types of signal processing for the purpose of improving image quality. Japanese Patent Laid-Open No. 2005-252869 discloses that a video signal processing apparatus configured to perform edge enhancement processing and tone conversion processing performs edge enhancement processing in accordance with tone processing characteristics.

SUMMARY OF THE INVENTION

It is conceivable that both edge enhancement processing and tone conversion processing are intensively performed with respect to a high-contrast video with blurred edges and blocked up shadows or blown out highlights. In performing edge enhancement processing in accordance with tone conversion processing characteristics, the edge enhancement processing is influenced by the tone conversion processing characteristics and hence may not be properly performed.

Some embodiments of the present invention provide a technique advantageous in improving the effect of image processing.

According to some embodiments, an image processing apparatus comprising: a tone correction unit configured to generate a plurality of tone correction signals by converting tone characteristics of a plurality of image signals in different wavelength bands; an edge enhancement unit configured to generate an edge enhancement signal by performing predetermined processing with respect to at least one image signal of the plurality of image signals; and a combining unit configured to combine a signal based on the plurality of tone correction signals and the edge enhancement signal, wherein the tone correction unit is configured to generate at least two tone correction signals by converting tone characteristics of at least two image signals of the plurality of image signals while maintaining ratios between pixels respectively corresponding to the at least two image signals, is provided.

According to some other embodiments, an image processing method comprising: generating a plurality of tone correction signals by converting tone characteristics of a plurality of image signals; generating an edge enhancement signal by performing predetermined processing with respect to at least one image signal of the plurality of image signals; and combining a signal based on the plurality of tone correction signals and the edge enhancement signal, wherein in the generating the plurality of tone correction signals, at least two tone correction signals are generated by converting tone characteristics of the at least two image signals of the plurality of image signals while pixel value ratios between pixels respectively corresponding to at least two image signals of the plurality of image signals are maintained, is provided.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of an image processing apparatus according to this embodiment;

FIG. 2 is a block diagram showing an example of the arrangement of a tone correction unit of the image processing apparatus in FIG. 1;

DESCRIPTION OF THE EMBODIMENTS

Figure 3:
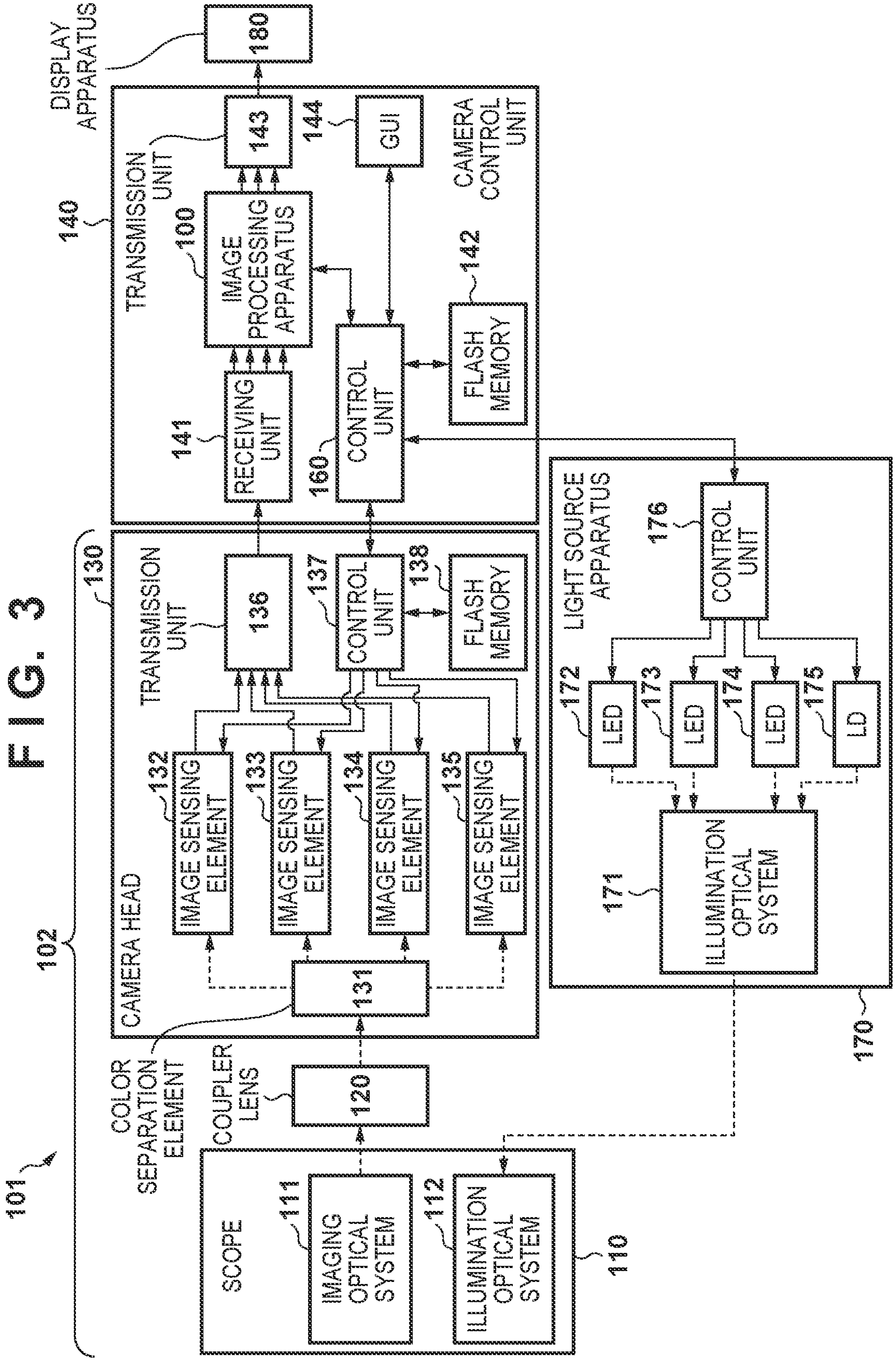
FIG. 3 is a block diagram showing an example of the arrangement of an endoscopic apparatus using the image processing apparatus according to this embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An image processing apparatus according to an embodiment of this disclosure will be described with reference to FIGS. 1 to 6. FIG. 1 shows an example of the arrangement of an image processing apparatus 100 according to this embodiment. The image processing apparatus 100 includes a tone correction unit 152, an edge enhancement unit 153, and a combining unit 157. The tone correction unit 152 generates a plurality of tone correction signals 211 and 212 by converting the tone characteristics of a plurality of image signals 201 and 202 in different wavelength bands. In the arrangement shown in FIG. 1, the two image signals 201 and 202 are input to the tone correction unit 152. The edge enhancement unit 153 generates an edge enhancement signal 221 by performing predetermined processing with respect to at least the one image signal 201 of the plurality of image signals 201 and 202. The tone correction signals 211 and 212 generated by the tone correction unit 152 and the edge enhancement signal 221 generated by the edge enhancement unit 153 are input to the combining unit 157. The combining unit 157 generates composite signals 231 and 232 by combining the plurality of tone correction signals 211 and 212 and the edge enhancement signal 221.

As shown in FIG. 1, the image signal 201 is parallelly input to the tone correction unit 152 and the edge enhancement unit 153. Accordingly, the tone correction unit 152 performs tone correction processing with respect to the image signal 201 input to the image processing apparatus 100. The edge enhancement unit 153 performs edge enhancement processing with respect to the image signal 201 input to the image processing apparatus 100 without being influenced by noise enhancement or a decrease in contrast by tone correction processing. In addition, combining the edge enhancement signal 221 with the tone correction signals 211 and 212 after tone correction processing makes it possible to improve the local contrast of a portion that has decreased in contrast due to compression processing at the time of tone correction processing.

FIG. 2 shows an example of the arrangement of the tone correction unit 152. The tone correction unit 152 includes a gain multiplication unit 521 and a gain calculation unit 522. The two input image signals 201 and 202 are parallelly input to the gain calculation unit 522 and the gain multiplication unit 521. The gain calculation unit 522 calculates a gain value based on the two input image signals 201 and 202. The calculation of the gain value will be described in detail later. The calculated gain value is input to the gain multiplication unit 521. The gain multiplication unit 521 applies the gain value calculated by the gain calculation unit 522 to each of the two input image signals 201 and 202 to output the tone correction signals 211 and 212. Since the gain multiplication unit 521 applies the same gain value to the image signals 201 and 202, the tone correction signals 211 and 212 are generated while the pixel value ratios between pixels respectively corresponding to the two image signals 201 and 202 are maintained. In other words, the tone correction unit 152 generates the plurality of tone correction signals 211 and 212 by converting the tone characteristics of the two image signals 201 and 202 while maintaining the pixel value ratios between the pixels respectively corresponding to the two image signals 201 and 202. The tone correction unit 152 converts the tone characteristics while maintaining the pixel value ratios between the pixels respectively corresponding to the plurality of image signals 201 and 202 and hence performs tone correction processing without changing hue and saturation.

In this case, the image signals 201 and 202 input to the image processing apparatus 100 are signals in different wavelength bands which are obtained by imaging the same object. The image signals 201 and 202 may be image signals in different wavelength bands which are obtained by one imaging operation. In addition, for example, the image signals 201 and 202 may be image signals continuously obtained by imaging while illuminations in different wavelength bands are switched. For example, the image signals 201 and 202 may be image signals in different wavelength bands of red, green, blue, and the like. Alternatively, for example, the image signal 201 may be an image signal of visible light, and the image signal 202 may be an image signal of invisible light. A more specific example is an endoscopic apparatus including the image processing apparatus 100 according to this embodiment. The image processing apparatus 100 will be described in more detail below.

FIG. 3 shows an example of the arrangement of an endoscopic apparatus 101 including the image processing apparatus 100 according to this embodiment. The endoscopic apparatus 101 includes a light source apparatus 170, an imaging apparatus 102 that generates a plurality of image signals by imaging an object irradiated by the light source apparatus 170, a camera control unit 140 including the image processing apparatus 100 described above, and a display apparatus 180. The imaging apparatus 102 includes a scope 110, a coupler lens 120, and a camera head 130.

The scope 110 can be inserted into, for example, the body of a subject. The light exiting from the light source apparatus 170 irradiates the subject through an illumination optical system 112 provided in the scope 110. The reflected light of the light irradiating the subject and the fluorescence generated by the light irradiating the subject are formed into images on image sensing elements 132 to 135 through an imaging optical system 111 provided in the scope 110, the coupler lens 120, and a color separation element 131 provided in the camera head 130. The image signals output from the image sensing elements 132 to 135 are output from the camera head 130 through a transmission unit 136 and input to the camera control unit 140. In the camera control unit 140, a receiving unit 141 reproduces the input image signals. The reproduced image signals obtained by the image sensing elements 132 to 135 are input to the image processing apparatus 100. The image signals processed by the image processing apparatus 100 are transferred from the camera control unit 140 to the display apparatus 180 through a transmission unit 143. The display apparatus 180 then displays an image (video).

The user can make operation settings and the like for the camera head 130, the light source apparatus 170, and the image processing apparatus 100 by operating input units such as a graphical user interface (GUI) 144 provided for the camera control unit 140. A control unit 160 provided in the camera control unit 140 receives the settings input by the user via the GUI 144 and appropriately changes processing in the image processing apparatus 100 or control on the camera head 130. For example, when changing the contents of control on the operation of the camera head 130, the control unit 160 of the camera control unit 140 transfers control signals to a control unit 137 provided in the camera head 130. The control on the operations of the image sensing elements 132 to 135 are then changed in accordance with the control signals.

The camera head 130 may be provided with a flash memory 138. The flash memory 138 may store programs associated with the operation and control of the camera head 130, adjustment parameters for correcting the individual differences of the camera head 130, and the like.

The camera control unit 140 may be provided with a flash memory 142. The flash memory 142 may store programs associated with the operation and control of the camera control unit 140, values set externally by, for example, the user. The flash memories 138 and 142 may be other storages such as HDDs.

In this embodiment, the light source apparatus 170 includes three types of light-emitting diodes (LEDs) 172 to 174 and a laser diode (LD) 175. The light source apparatus 170 combines exit light from the LEDs 172 to 174 and the LD 175 using an illumination optical system 171 provided in the light source apparatus 170 and outputs the resultant light to the illumination optical system 112 provided in the scope 110. The control unit 160 provided in the camera control unit 140 outputs a control signal to a control unit 176 provided in the light source apparatus 170 as needed, and the light source apparatus 170 adjusts the type, timing, and output level of a light source to be turned on in accordance with the control signal.

For example, the LED 172 may emit light in the red wavelength band, the LED 173 may emit light in the green wavelength band, and the LED 174 may emit light in the blue wavelength band. For example, the LD 175 may emit light with the infrared excitation wavelength of a fluorescence reagent. The light emitted by the LD 175 other than general visible light is sometimes referred to as special light. The image signal obtained by irradiation with such special light is sometimes referred to as a special light image signal.

Special light image signals include, for example, the image signals obtained by invisible light, fluorescence obtained by irradiation with excitation light, and reflected light obtained by irradiation with narrowband light with a half bandwidth of 20 μm or less. In this embodiment, a special light image signal is an image signal obtained from the fluorescence excited by infrared excitation light (LD 175). In this case, the reflected light of the infrared excitation light can be removed by a wavelength cut filter (not shown).

The wavelengths separated in the color separation element 131 respectively correspond to the wavelengths generated by the LEDs 172 to 174 and the LD 175. The color separation element 131 respectively inputs light in the red wavelength band, light in the green wavelength band, and light in the blue wavelength band to the image sensing element 132, the image sensing element 133, and the image sensing element 134 and inputs light in the wavelength band of the fluorescence excited by infrared excitation light to the image sensing element 135. Outputs from the image sensing elements 132 to 135 are transferred as signals R_in, G_in, B_in, and IR_in to the image processing apparatus 100.

Figure 4:
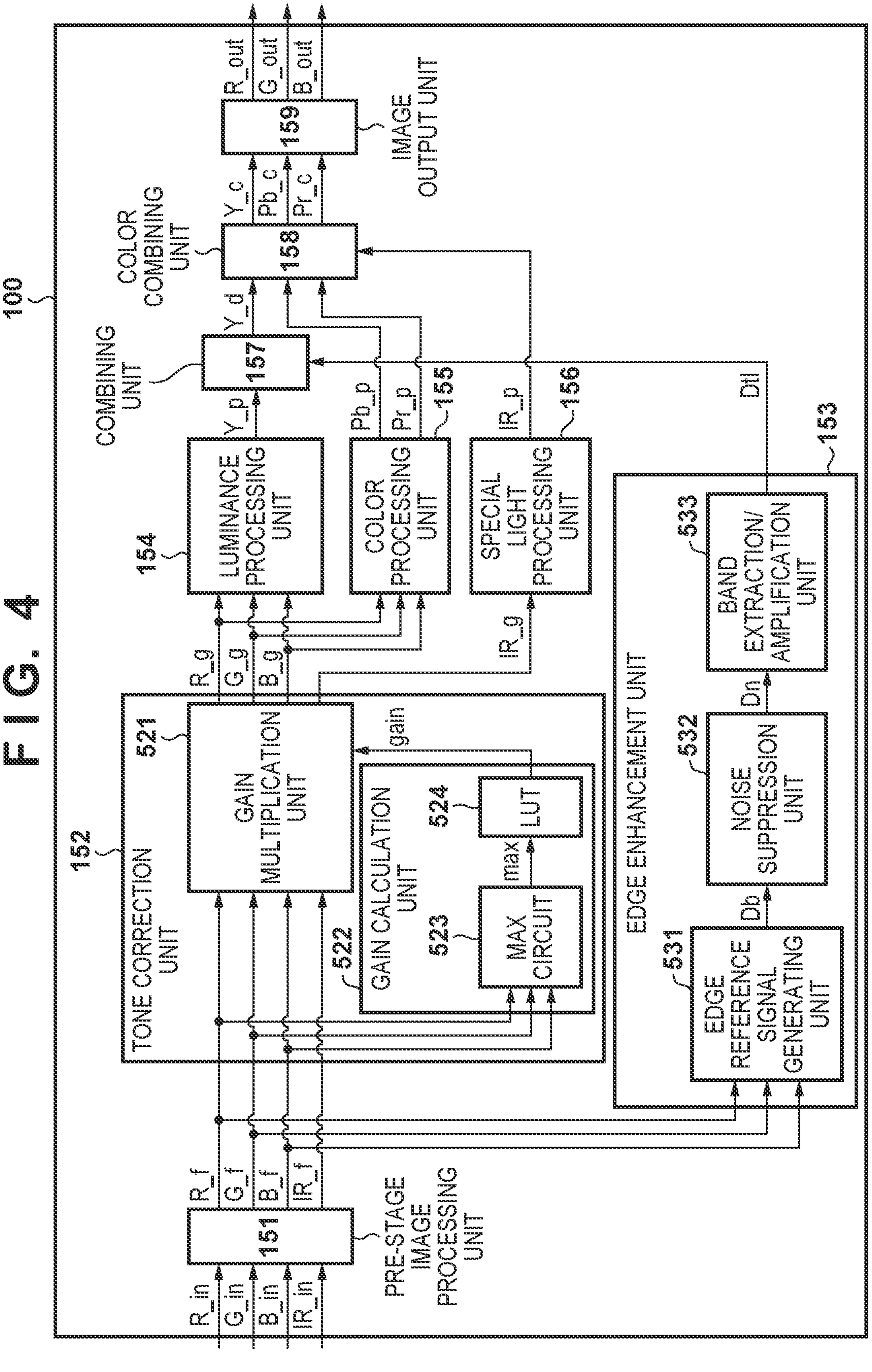
FIG. 4 is a block diagram showing an example of the arrangement of the image processing apparatus in FIG. 3.

FIG. 4 shows an example of the arrangement of the image processing apparatus 100 provided in the camera control unit 140 according to this embodiment. The image processing apparatus 100 includes the tone correction unit 152, the edge enhancement unit 153, and the combining unit 157 described above. In addition, in the arrangement shown in FIG. 4, the image processing apparatus 100 includes a pre-stage image processing unit 151, a luminance processing unit 154, a color processing unit 155, a special light processing unit 156, a color combining unit 158, and an image output unit 159.

First of all, the pre-stage image processing unit 151 processes the signals R_in, G_in, B_in, and IR_in input to the image processing apparatus 100. The pre-stage image processing unit 151 executes, for example, digital gain processing, linear matrix processing, defective pixel correction processing, shading correction processing, and the like with respect to each of the signals R_in, G_in, B_in, and IR_in.

Outputs from the pre-stage image processing unit 151 are transferred to the tone correction unit 152 and the edge enhancement unit 153. Accordingly, image signals R_f, G_f, B_f, and IR_f that are outputs from the pre-stage image processing unit 151 correspond to the image signals 201 and 202 described above. In the arrangement shown in FIG. 4, the image signals R_f, G_f, B_f, and IR_f are transferred to the tone correction unit 152. The image signals R_f, G_f, and B_f are transferred parallelly to the edge enhancement unit 153 as well as the tone correction unit 152. Accordingly, in the arrangement shown in FIG. 4, the image signals R_f, G_f, and B_f correspond to the image signal 201 described above, and the image signal IR_f corresponds to the image signal 202 described above.

The tone correction unit 152 determines a gain value based on at least one of the plurality of image signals R_f, G_f, B_f, and IR_f and applies the gain value to each of the image signals R_f, G_f, B_f, and IR_f. The tone correction unit 152 generates tone correction signals R_g, G_g, B_g, and IR_g corresponding to the tone correction signals 211 and 212 described above. In the arrangement shown in FIG. 4, the three image signals R_f, G_f, and B_f that are part of the signals input to the tone correction unit 152 are input to a MAX circuit 523 provided in the gain calculation unit 522 of the tone correction unit 152. The MAX circuit 523 obtains the maximum pixel value among the pixel values included in the input image signals R_f, G_f, and B_f. A signal max indicating the obtained maximum pixel value is input to a LUT 524 provided in the gain calculation unit 522, and a signal gain indicating a gain value as an output is transferred to the gain multiplication unit 521. In this manner, the tone correction unit 152 determines a gain value based on the maximum pixel value among the pixel values included in at least one of the plurality of image signals R_f, G_f, B_f, and IR_f. At this time, unlike the arrangement shown in FIG. 2, the image signals R_f, G_f, B_f, and IR_f may include the image signal IR_f that is not used by the tone correction unit 152 for the determination of a gain value. For example, as in the arrangement shown in FIG. 4, the tone correction unit 152 may determine a gain value based on the image signals R_f, G_f, and B_f of visible light among the plurality of image signals R_f, G_f, B_f, and IR_f. The tone correction unit 152 may not use the image signal IR_f of special light described above among the plurality of image signals R_f, G_f, B_f, and IR_f for the determination of a gain value.

The gain multiplication unit 521 applies the gain value calculated by the gain calculation unit 522 to the image signals R_f, G_f, B_f, and IR_f. For example, the gain multiplication unit 521 may apply the gain value to the image signals R_f, G_f, and B_f of visible light. This generates tone correction signals R_g, G_g, and B_g by converting the tone characteristics of the image signals R_f, G_f, and B_f while maintaining the pixel value ratios between the pixels respectively corresponding to the image signals R_f, G_f, and B_f. In this manner, the tone correction unit 152 may generate at least two tone correction signals by converting the tone characteristics of at least two image signals while maintaining the pixel value ratios between pixels respectively corresponding to at least two of the plurality of image signals R_f, G_f, B_f, and IR_f.

In addition, the gain multiplication unit 521 may uniformly apply the gain value calculated by the gain calculation unit 522 to the image signals R_f, G_f, B_f, and IR_f as shown in FIG. 4. That is, the tone correction unit 152 may generate the plurality of tone correction signals R_g, G_g, B_g, and IR_g by converting the tone characteristics of the plurality of image signals R_f, G_f, B_f, and IR_f while maintaining the pixel value ratios between the pixels respectively corresponding to all the image signals R_f, G_f, B_f, and IR_f.

The tone correction signals R_g, G_g, and B_g are transferred parallelly to the luminance processing unit 154 and the color processing unit 155. The tone correction signal IR_g is transferred to the special light processing unit 156.

The image signals R_f, G_f, and B_f input to the edge enhancement unit 153 are transferred to an edge reference signal generating unit 531. For example, the edge reference signal generating unit 531 generates a Y signal as a reference signal Db from the image signals R_f, G_f, and B_f (R, G, and B signals). In addition, for example, the edge reference signal generating unit 531 may generate an average signal between the image signal R_f and the image signal G_f and uses the average signal as the reference signal Db. In addition, for example, the edge reference signal generating unit 531 may set the image signal G_f of the input image signals R_f, G_f, and B_f as a reference signal. The reference signal Db as an output from the edge reference signal generating unit 531 is transferred to a noise suppression unit 532. The noise suppression unit 532 performs, for example, frame circulation processing, filter processing, or composite processing thereof with respect to the reference signal Db. The reference signal Db having undergone noise suppression by the noise suppression unit 532 is transferred as a reference signal Dn to a band extraction/amplification unit 533.

The band extraction/amplification unit 533 extracts one or more spatial frequency band components of the reference signal Dn which are enhanced as edge signals. The band extraction/amplification unit 533 performs gain adjustment for each extracted spatial frequency band component, combines the components in the respective bands as needed, and outputs the composite component as an edge enhancement signal Dtl (corresponding to the edge enhancement signal 221 described above). The edge enhancement unit 153 generates the reference signal Dn based on at least one image signal of the plurality of image signals R_f, G_f, B_f, and IR_f and extracts one or more spatial frequency band components from the reference signal, thereby generating the edge enhancement signal Dtl.

The edge enhancement unit 153 may divide the reference signal Db as an output from the edge reference signal generating unit 531 into a plurality of signals (for example, reference signals Db1 and Db2) according to signal amplitudes and perform noise suppression processing and band extraction/amplification processing with different characteristics with respect to each reference signal. The edge enhancement unit 153 may combine a plurality of outputs after the band extraction/amplification processing and output the composite output as the edge enhancement signal Dtl. That is, the edge enhancement unit 153 may generate the edge enhancement signal Dtl by extracting a plurality of spatial frequency band components from the reference signal Db, adjusting the ratios between the plurality of spatial frequency band components, and combining the plurality of spatial frequency band components having undergone ratio adjustment.

The luminance processing unit 154 generates a Y signal (luminance signal Y_p) based on the input tone correction signals R_g, G_g, and B_g (R, G, and B signals). The luminance processing unit 154 may execute, for example, noise suppression processing and band limitation processing before or after the generation of the luminance signal Y_p. The color processing unit 155 generates color difference signals Pb and Pr based on the input tone correction signals R_g, G_g, and B_g (R, G, and B signals). The color processing unit 155 may execute, for example, color matrix processing, chroma gain processing, color phase shift suppression processing, noise suppression processing, and band limitation processing before or after the generation of the color difference signals Pb and Pr. In the arrangement shown in FIG. 4, the luminance processing unit 154 and the color processing unit 155 are shown as separate arrangements. However, these units may be integrated and configured to perform each process. The respective arrangements are shown separately only for the clarification of each process to be executed. The same applies to other arrangements.

As described above, the tone correction signal IR_g is transferred from the tone correction unit 152 to the special light processing unit 156. The special light processing unit 156 executes, for example, noise suppression processing, band limitation processing, tone correction processing, shading correction processing, and offset adjustment processing with respect to the tone correction signal IR_g and outputs a signal IR_p.

The combining unit 157 receives the luminance signal Y_p output from the luminance processing unit 154 and the edge enhancement signal Dtl output from the edge enhancement unit 153. The combining unit 157 combines the luminance signal Y_p generated by the luminance processing unit 154 with the edge enhancement signal Dtl generated by the edge enhancement unit 153 based on the plurality of tone correction signals R_g, G_g, and B_g generated by the tone correction unit 152. As a combining method, for example, the luminance signal Y_p and the edge enhancement signal Dtl may be simply added. The combining unit 157 outputs a luminance signal Y_d obtained by performing edge enhancement of the luminance signal Y_p.

The combining unit 157, the color processing unit 155, and the special light processing unit respectively transfer the luminance signal Y_d, color difference signals Pb_p and Pr_p, and the signal IR_p to the color combining unit 158. In the normal display mode associated with visible light, the input luminance signal Y_d and the input color difference signals Pb_p and Pr_p can be outputs from the color combining unit 158 without any change. In a display mode using special light, the color combining unit 158 executes combining processing so as to visualize and enhance the image (video) obtained by special light. For example, the color combining unit 158 executes processing such as changing a color in accordance with a pixel value ratio with the luminance signal Y_p output from the luminance processing unit 154 and the tone correction signal IR_p output from the tone correction unit 152.

The image output unit 159 transfers signals Y_c, Pb_c, and Pr_c from the color combining unit 158. The image output unit 159 may execute, for example, processing such as RGB conversion and signal value range limitation in accordance with the specifications of an output signal from the camera control unit 140. As described above, the combining unit 157 combines the luminance signal Y_p based on the tone correction signals R_g, G_g, and B_g and the edge enhancement signal Dtl into the luminance signal Y_d. The color combining unit 158 generates the signals Y_c, Pb_c, and Pr_c based on the luminance signal Y_d, the color difference signals Pb_p and Pr_p generated by the color processing unit 155, and the signal IR_p generated by the special light processing unit 156. The image output unit 159 may be provided with a non-linear correction unit that performs correction processing such as gamma correction in accordance with the non-linear characteristics of the display apparatus 180 connected to the image processing apparatus 100 (the camera control unit 140) with respect to the signals Y_c, Pb_c, and Pr_c based on the signal obtained by combining by the combining unit 157. Upon executing such processing, the image processing apparatus 100 outputs signals Rout, G out, and Bout. The signals Rout, G out, and Bout are transferred to the display apparatus 180 via the transmission unit 143, and the display apparatus 180 displays an image (video).

Figure 5:
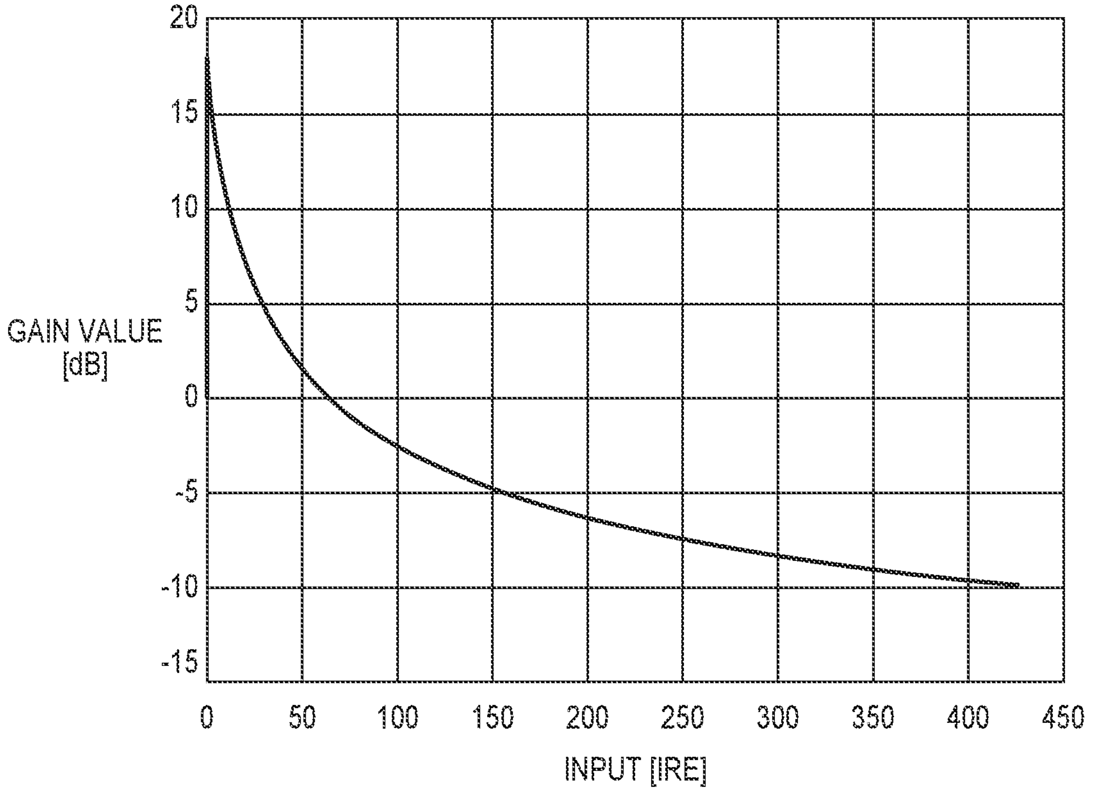
FIG. 5 is a graph showing an example of the LUT characteristic of the tone correction unit of the image processing apparatus in FIG. 3.

FIG. 5 shows an example of the characteristics of the LUT 524 of the tone correction unit 152 according to this embodiment. Assume that a black signal and a reference white signal in the display apparatus 180 are respectively set at 0IRE and 100IRE, and the range of signals that can be input to the display apparatus 180 is from 0IRE to 109IRE. Assume also that outputs from the image sensing elements 132 to 135 and inputs to the image processing apparatus 100 fall within the range from 0IRE to 425IRE. In this case, in order to implement tone display with good visibility by suppressing blocked up shadows and blown out highlights, it is necessary to increase the signal levels of dark portions, suppress the signal levels of bright portions, and concentrate signals in an intermediate signal level region. FIG. 5 shows an example of the characteristics of the LUT 524 for the implementation of such display.

The abscissa in FIG. 5 represents the level (IRE) of an input signal in the LUT 524. The ordinate represents a gain value (dB) as an output from the LUT 524. An input signal in the LUT 524 is the maximum pixel value (signal max) among the pixel values included in the image signals R_f, G_f, and B_f as described above.

In order to correct blocked up shadows, it is necessary to increase the gains in a region of small input signals. In the case shown in FIG. 5, for example, the gain at the time of input of 0IRE is set at the output peak. The output peak may be set within 10% of the maximum input range (the input level range from 0IRE to 42.5IRE in this embodiment) although slight increases and decreases are allowed depending on noise. That is, the pixel values (signals max) respectively included in the plurality of image signals R_f, G_f, and B_f have the signal range from the minimum luminance value (0IRE) to the maximum luminance value (425IRE). At this time, the gain value may fall within the range in which the maximum pixel value (signal max) falls within 10% (42.5IRE) of the signal range from the minimum luminance value (0IRE).

In addition, in order to concentrate signals in an intermediate signal level region for natural appearance, outputs may monotonically decrease in the range from an input corresponding to the output peak to at least an input corresponding to 50% (up to an input corresponding to 212.5IRE in this embodiment). That is, when the maximum pixel value (signal max) falls within the range from a pixel value corresponding to the maximum gain value to a pixel value corresponding to 50% (212.5IRE) of the signal range, the gain values may monotonically decrease from the signal value corresponding to the maximum gain value to the signal value corresponding to 50% (212.5IRE) of the signal range. In the high-luminance portion (212.5IRE to 425IRE) where the signal input (signal max) exceeds 50%, as shown in FIG. 5, the monotonic decrease in gain value may be continued, or the gain value may turn to increase to prevent a decrease in the maximum value of an output from the tone correction unit 152.

Figure 6:
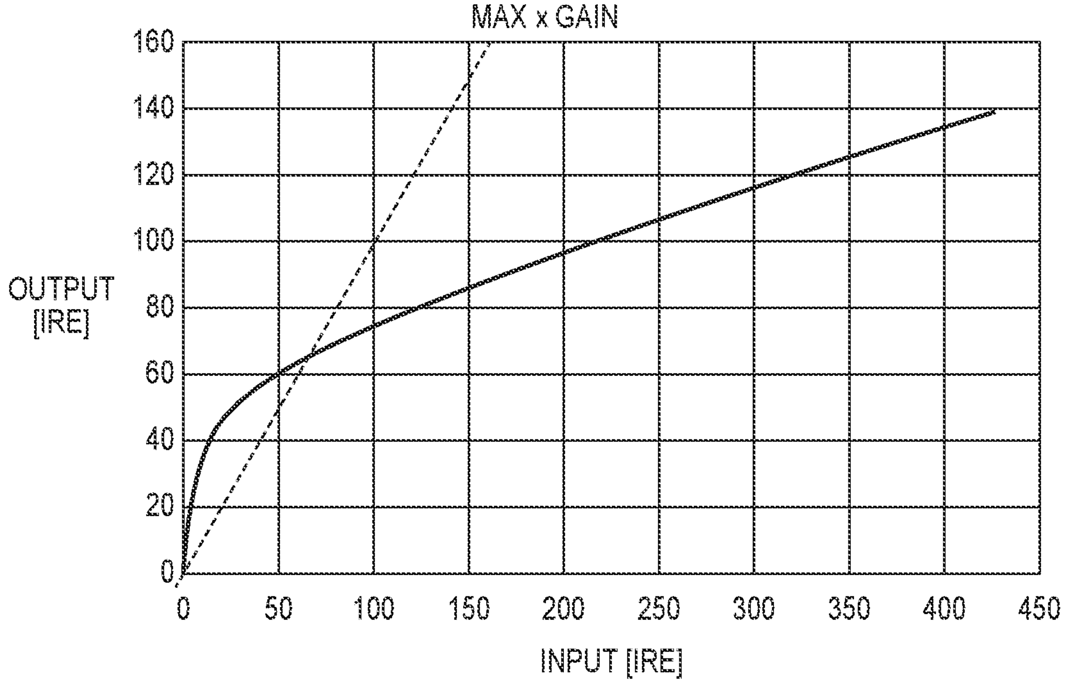
FIG. 6 is a graph showing an example of the input/output characteristic of the tone correction unit of the image processing apparatus in FIG. 3

FIG. 6 shows an example of the input/output characteristics of the tone correction unit 152 according to this embodiment. FIG. 6 shows the characteristics of part of an output signal from the tone correction unit 152 when an image signal as the basis of the signal max is multiplied by the gain value of the LUT 524 having the characteristics shown in FIG. 5. With regard to signal inputs, a dark portion is amplified, a bright portion is suppressed, and signals are concentrated in the intermediate signal level region. Although the contrast in the intermediate signal level region has decreased, signal values output over the entire signal level region monotonically increase (if $x<y$, then $f(x)\leq f(y)$).

The tone correction unit 152 includes the gain calculation unit 522 that outputs a gain value for the input of at least one image signal of a plurality of image signals. At this time, the input/output characteristics of the gain calculation unit 522 may be configured to be changeable in accordance with user settings. For example, the characteristics of the LUT 524 may be switched to other characteristics in response to the reception of a control signal from the control unit 160 according to a user input via the GUI 144. For example, the characteristics of the LUT 524 may be switched to other characteristics depending on whether the image signal IR_f of special light is used. In addition, in response to the reception of a control signal from the control unit 160 according to a user input via the GUI 144, the degree of tone correction may be adjusted by various methods such as weighted interpolation of a gain value with 1.

The endoscopic apparatus 101 having this arrangement applies tone correction processing to the input image signals R_f, G_f, B_f, and IR_f and executes edge enhancement processing without influence by noise enhancement by tone correction processing and a decrease in contrast. In addition, the local contrast of a portion which has decreased in contrast can be improved by combining the edge enhancement signal Dtl having undergone edge enhancement processing with the luminance signal Y_p based on the tone correction signals R_g, G_g, and B_g after tone correction. This makes it possible to output an image having undergone effective processing for edge blurring, display of a high-contrast scene, noise in a dark portion, and the like which generally impose problems in the endoscopic apparatus 101. In addition, the ratios between the pixel values of the image signals R_f, G_f, and B_f and the image signal IR_f can be maintained while tone correction processing and edge enhancement processing are performed based on the image signals R_f, G_f, and B_f (R, G, and B signals). That is, the tone correction unit 152 generates the plurality of tone correction signals R_g, G_g, B_g, and IR_g respectively corresponding to the image signals R_f, G_f, and B_f of visible light and the image signal IR_g of special light upon conversion of the tone characteristics while maintaining the pixel value ratios between the pixels respectively corresponding to the image signals R_f, G_f, and B_f of visible light and the image signal IR_f of special light of the plurality of image signals R_f, G_f, B_f, and IR_f. This makes it possible to execute proper processing according to the signal ratios between the images obtained by visible light and the image obtained by special light such as invisible light in signal processing on the subsequent stage.

This disclosure makes it possible to perform tone correction processing independently of edge enhancement processing but does not deny the execution of non-linear processing or tone correction processing for an edge enhancement signal. For example, for the purpose of saving the number of bits for signal processing, a gamma correction curve or Log curve may be applied to the signals respectively generated by the edge enhancement unit 153, the luminance processing unit 154, and the color processing unit 155. In addition, in tone correction processing, since an increase in noise cannot be completely suppressed, noise reduction processing according to, for example, the degree of tone correction processing may be performed at an appropriate timing in the image processing apparatus 100. In the above embodiment, there is no mention about a delay circuit that matches the timings of the respective signals. Obviously, however, a delay circuit is used as needed in accordance with the arrangement of a circuit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124104, filed Aug. 3, 2022, which is hereby incorporated by reference herein in its entirety.

What is claimed is:

1. An image processing apparatus comprising:
at least one processor; and
at least one memory having stored thereon instructions which, when executed by the at least one processor, cause the image processing apparatus at least to:
generate a plurality of tone correction signals by converting tone characteristics of a plurality of image signals in different wavelength bands;
generate an edge enhancement signal by performing predetermined processing with respect to at least one image signal of the plurality of image signals; and
combine (a) a signal based on the plurality of tone correction signals and (b) the edge enhancement signal,
wherein tone correction processing includes generating at least two tone correction signals by applying a common gain value to at least two image signals of the plurality of image signals while maintaining ratios between the at least two image signals,
wherein the common gain value changes in response to at least one image signal of the at least two image signals, and
wherein the tone correction processing and edge enhancement processing are configured to be performed independently.

2. The apparatus according to claim 1, wherein the tone correction processing includes generating the plurality of tone correction signals by converting tone characteristics of the plurality of image signals while maintaining pixel value ratios between pixels respectively corresponding to all the plurality of image signals.

3. The apparatus according to claim 1, wherein the plurality of image signals include an image signal that is not used by the tone correction processing for determination of the common gain value.

4. The apparatus according to claim 1, wherein the tone correction processing further includes determining the common gain value based on a maximum pixel value among pixel values included in at least one of the plurality of image signals.

5. The apparatus according to claim 4, wherein pixel values included in respective image signals have a signal range from a minimum luminance value to a maximum luminance value,
the common gain value becomes maximum when the maximum pixel value falls within a range from the minimum luminance value to 10% of the signal range, and
when the maximum pixel value falls within a range from a pixel value corresponding to a maximum gain value to 50% of the signal range, the common gain value monotonically decreases from a pixel value corresponding to the maximum gain value to 50% of the signal range.

6. The apparatus according to claim 1, wherein the tone correction processing further includes outputting the common gain value with respect to input of at least one image signal of the plurality of image signals, and an input/output characteristic is configured to be changeable in accordance with a user setting.

7. The apparatus according to claim 1, wherein the tone correction processing further includes determining the common gain value based on an image signal of visible light of the plurality of image signals.

8. The apparatus according to claim 1, wherein the tone correction processing does not use, for determination of the common gain value, an image signal, of the plurality of image signals, which is of special light including at least one of invisible light, fluorescence generated by irradiation with excitation light, and reflected light generated by irradiation with narrow-band light with a half bandwidth of not more than 20 μm.

9. The apparatus according to claim 8, wherein the tone correction processing further includes generating tone correction signals respectively corresponding to the plurality of tone correction signals obtained by converting tone characteristics of the image signal of visible light and the image signal of special light while maintaining pixel value ratios between pixels respectively corresponding to the image signal of visible light and the image signal of special light of the plurality of image signals.

10. The apparatus according to claim 1, wherein the edge enhancement processing includes generating a reference signal based on at least one image signal of the plurality of image signals and is configured to generate the edge enhancement signal by extracting a component in not less than one spatial frequency band from the reference signal.

11. The apparatus according to claim 10, wherein the edge enhancement processing includes generating the edge enhancement signal by extracting components in a plurality of spatial frequency bands from the reference signal, adjusting ratios between components in the plurality of spatial frequency bands, and combining the components in the plurality of spatial frequency bands having undergone ratio adjustment.

12. The apparatus according to claim 1, wherein the instructions, when executed by the at least one processor, further cause the image processing apparatus at least to perform correction processing with respect to a signal obtained by combining by combining processing according to a non-linear characteristic of a display apparatus connected to the image processing apparatus.

13. An endoscopic apparatus comprising:
a light source apparatus;
an imaging apparatus configured to generate the plurality of image signals by imaging an object irradiated by the light source apparatus; and the image processing apparatus according to claim 1.

14. The apparatus according to claim 1, wherein by inputting the at least one image signal in parallel for the tone correction processing and the edge enhancement processing, the tone correction processing and the edge enhancement processing are performed independently for the at least one image signal.

15. The apparatus according to claim 1, wherein the tone correction processing and the edge enhancement processing are configured to be performed independently for one signal.

16. An image processing method comprising:

generating a plurality of tone correction signals by converting tone characteristics of a plurality of image signals;

generating an edge enhancement signal by performing predetermined processing with respect to at least one image signal of the plurality of image signals; and combining a signal based on the plurality of tone correction signals and the edge enhancement signal, wherein in the generating the plurality of tone correction signals, at least two tone correction signals are generated by applying a common gain value to at least two image signals of the plurality of image signals while maintaining ratios between the at least two image signals of the plurality of image signals, wherein the common gain value changes in response to at least one image signal of the at least two image signals, and wherein tone correction processing in the generating the plurality of tone correction signals and edge enhancement processing in the generating the edge enhancement signal are configured to be performed independently.

17. The method according to claim 16, wherein the plurality of image signals include an image signal of visible light and an image signal of special light including at least one of invisible light, fluorescence generated by irradiation with excitation light, and reflected light generated by irradiation with narrow-band light with a half bandwidth of not more than 20 μm, and in the generating the plurality of tone correction signals, tone correction signals respectively corresponding to the plurality of tone correction signals obtained by converting tone characteristics of the image signal of visible light and the image signal of the special light are generated while pixel value ratios between pixels respectively corresponding to the image signal of visible light and the image signal of the special light are maintained.

18. A non-transitory computer-readable storage medium storing a program for causing a computer to execute the method according to claim 16.

* * * * *